United States Patent
Esser

(10) Patent No.: US 8,082,527 B1
(45) Date of Patent: Dec. 20, 2011

(54) REPRESENTING THE BEHAVIORS OF A PACKET PROCESSOR

(75) Inventor: Robert P. Esser, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 834 days.

(21) Appl. No.: 12/168,533

(22) Filed: Jul. 7, 2008

(51) Int. Cl.
G06F 17/50 (2006.01)

(52) U.S. Cl. ............... 716/103; 716/104; 703/16

(58) Field of Classification Search .......... 716/103, 716/104; 703/16
See application file for complete search history.

(56) References Cited

U.S. PATENT DOCUMENTS

| | | | | |
|---|---|---|---|---|
| 5,121,003 | A | * | 6/1992 | Williams ............... 326/121 |
| 5,469,367 | A | * | 11/1995 | Puri et al. ............... 716/104 |
| 5,671,151 | A | * | 9/1997 | Williams ............... 716/113 |
| 7,636,908 | B1 | | 12/2009 | Brebner |
| 7,669,166 | B1 | | 2/2010 | Brebner et al. |
| 7,784,014 | B1 | | 8/2010 | Brebner et al. |
| 7,788,402 | B1 | | 8/2010 | Keller et al. |
| 7,792,117 | B1 | | 9/2010 | Keller et al. |
| 7,817,657 | B1 | | 10/2010 | Attig et al. |
| 7,990,867 | B1 | | 8/2011 | Keller et al. |

OTHER PUBLICATIONS

Karagianni et al., "A Petri Net Approach to the Design of Processor Array Architectures", Proceedings of the 38th Midwest Symposium on Circuits and Systems, Aug. 13-16, 1995, vol. 1, pp. 37-40.*
Malhotra et al., "Power-Hierarchy of Dependability-Model Types", IEEE Transactions on Reliability, vol. 43, No. 3, Sep. 1994, pp. 493-502.*
Xiaoli et al., "Reduction of Stochastic Petri Nets for Reliability Analysis", 8th International Conference on Eletronic Measurement and Instruments, Jul. 18 to Aug. 16, 2007, pp. 1-222 to 1-226.*
Peterson, James L.; Petri Net Theory and the Modeling of Systems; Copyright 1981 by Prentice-Hall, Inc.; pp. 10-25.
Goedertier, Stijn et al.; "Em-BrA2CE v0.1: A Vocabulary and Execution Model for Declarative Business Process Modeling"; Katholieke Universiteit Leuven; 2007). Available at SSRN: http://ssrn.com/abstract=1086027; pp. 1-74.
Usher, Michelle et al.; "A Concurrent Visual Language Based on Petri Nets"; 1998 IEEE Symposium on Visual Languages (VL 98), Halifax, . . . , 1998—doi.ieeecs.org; pp. 1-2.
Hanachi, C. et al.: "Mobile Agents Behaviours: from Declarative Specifications to Implementation"; Cooperative Information Agent III, CIA'99; pp. 1-12 , Jul. 31 to Aug. 2, 1999.
Pesic, M. et al.: "A Declarative Approach for Flexible Business Processes Management"; Business Process Management Workshops, 2006; Copyright 2006; Published by Springer Berlin; pp. 1-12.
Murata, Tadao; "Petri Nets: Properties, Analysis and Applications"; Proceedings of the IEEE, vol. 77, No. 4, Apr. 1989; Copyright 1989 IEEE; pp. 541-580.

(Continued)

*Primary Examiner* — Phallaka Kik
(74) *Attorney, Agent, or Firm* — LeRoy D. Maunu; Lois D. Cartier

(57) ABSTRACT

Methods are provided for compactly representing behaviors of a processor of packets. A declarative description of the processor is input. The declarative description specifies rules for manipulating the packets. A dependency graph is generated from the declarative description. The dependency graph specifies each rule that depends upon another one or more of the rules. The declarative description and the dependency graph are transformed into a Petri net representing the behaviors of the processor. The Petri net includes respective transitions for the rules and places for enabling the transitions to fire. A specification of the Petri net is output. The Petri net represents the behaviors of the processor.

20 Claims, 5 Drawing Sheets

OTHER PUBLICATIONS

Best, Eike et al.; "Petri Nets, Process Algebras and Concurrent Programming Languages"; Published by Springer Berlin; Copyright 1988; pp. 1-83.
U.S. Appl. No. 11/818,788, filed Jun. 14, 2007, Attig et al.
U.S. Appl. No. 11/799,953, filed May 3, 2007, James-Roxby et al.

Applied Data Research, Inc., *Communication with Automata*, Jan. 1966 translation of 1962 Ph.D. thesis entitled "Kommunikation mit Automaten" by Dr. Carl Adam Petri, pp. 1-97, Applied Data Research, Inc., Princeton, New Jersy, USA.

* cited by examiner 202 set TTL = TTL − 1;
204 set checksum = 0xFFFF;
206 read memorydata from memoryreq;
208 { 210 [ version == 4 ]
212 insert memorydata after destination;
214 forward on packetout;

REPRESENTING THE BEHAVIORS OF A PACKET PROCESSOR

FIELD OF THE INVENTION

The present invention generally relates to packet processors, and more particularly to representing the behaviors of a packet processor.

BACKGROUND

A packet processor receives and processes packets including one or more fields. The packet processor modifies certain fields as a function of other fields and a stored state of the packet processor.

The operations of a packet processor can have dependencies between the operations. Certain orders of execution of the operations satisfy these dependencies while other orders of execution may violate the dependencies. An order of execution that satisfies the dependencies may allow multiple operations to be performed in parallel. An efficient and high-performance packet processor should perform many operations in parallel when possible. However, the resources available for implementing the packet processor might limit the processor's ability to perform operations in parallel.

Exploring alternative implementations of the packet processor generally involves analyzing the possible orders of execution of the operations of the packet processor. However, such analysis can be time-consuming and difficult, because the number of possible orders of execution is an exponential function of the number of different operations of the packet processor.

The present invention may address one or more of the above issues.

SUMMARY

Various embodiments of the invention provide methods of representing behaviors of a processor of packets. A declarative description of the processor is input. The declarative description specifies rules for manipulating the packets. A dependency graph is generated from the declarative description. The dependency graph specifies each rule that depends upon another one or more of the rules. The declarative description and the dependency graph are transformed into a Petri net representing the behaviors of the processor. The Petri net includes respective transitions for the rules and places for enabling the transitions to fire. A specification of the Petri net is output. The Petri net represents the behaviors of the processor.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Various embodiments of the invention permit the possible behaviors of a packet processor to be represented compactly and without listing all possible behaviors. In addition, the representation can be readily modified to limit the possible behaviors to permissible behaviors that satisfy certain implementation constraints.

Figure 1:
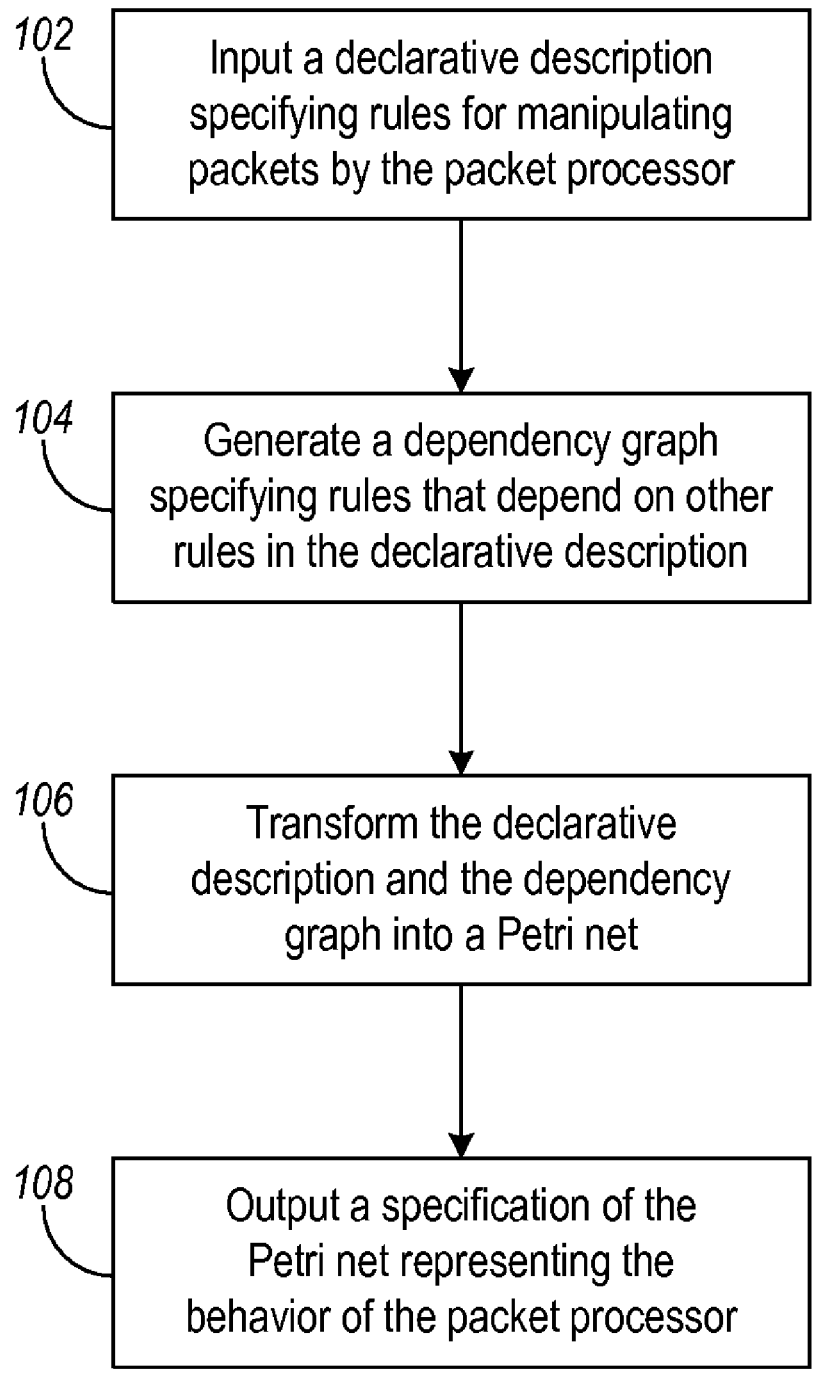
FIG. 1 is a flow diagram of a process for representing the behaviors of a packet processor in accordance with various embodiments of the invention.

FIG. 1 is a flow diagram of a process for representing the behaviors of a packet processor in accordance with various embodiments of the invention. The behaviors of the packet processer are represented by a Petri net that is generated from a declarative description of the packet processor.

At step 102, a declarative description of the packet processor is input, and the declarative description specifies rules for manipulating information fields of the packets. The declarative description can specify a rule that modifies the value of a field of a packet based on the value of other fields of the packet and a stored state of the packet processor. The declarative description can specify a rule that evaluates a function on fields of a packet and saves the result in the stored state of the packet processor. While the rules are frequently specified in a particular order in the declarative description, the declarative description does not specify an order of processing the specified rules; instead, the declarative description declares the rules without explicitly specifying an order of processing the rules.

At step 104, a dependency graph is generated that specifies dependencies between the rules. One rule can define data that is used by another rule. For example, one rule can produce data that is consumed by another rule, and the dependency graph would indicate this dependency with an edge between respective nodes for the two rules. The rule that produces the data must be processed before processing the rule that consumes the data. The dependencies in the dependency graph limit the possible orders of processing the rules. The dependency graph defines rule ordering limits implicitly specified in the declarative description.

At step 106, the declarative description is transformed into a Petri net using the dependency graph. The Petri net represents the possible behaviors of the packet processor, including feasible orders of execution of the rules and feasible parallel processing of the rules. The Petri net includes transitions, places, and arcs. Each rule is represented by one or more transitions in the Petri net. The transitions and the places are interconnected by the arcs.

At step 108, a specification of the Petri net is output. In one embodiment, the specification includes listings of the transitions, places, and arcs of the Petri net. In one embodiment, the specification represents the behaviors of all possible partial orders of a processor processing the rules.

Figures 2, 3:
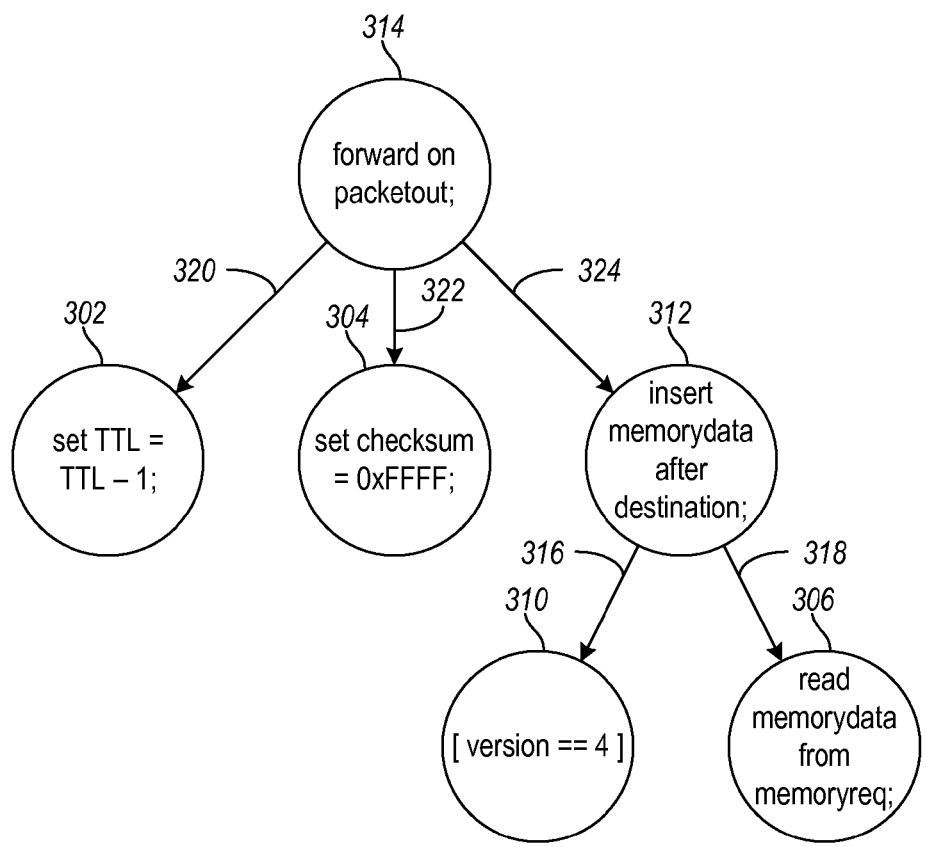
FIG. 2 is a listing diagram of a portion of an example declarative description of a packet processor in accordance with various embodiments of the invention.
FIG. 3 is a graph diagram of an example dependency graph for a packet processor in accordance with various embodiments of the invention.

FIG. 2 is a listing diagram of a portion of an example declarative description of a packet processor in accordance with various embodiments of the invention. The example declarative description includes a series of rules presented in an order that does not necessarily correspond to the order of processing the rules. Not shown in FIG. 2 is that the declarative description also specifies an input port and an output port, the formats of the types of packets received at the input port and sent at the output port, a local variable, and a local memory. The rules 202, 204, 206, 208, and 214 are applied to each packet received at the input port.

Rule 202 sets the "TTL" field of each received packet to a decremented value of this field. Rule 204 sets the "checksum" field of each received packet to a constant value. Rule 206 sets the local variable "memorydata" from the local memory "memoryreq."

Rule 208 has two components, a guard condition 210 and a guarded rule 212. The guard condition 210 checks whether the "version" field of the received packet equals a specific value. If this field does equal the specific value, then the guard condition 210 is satisfied and the guarded rule 212 is processed. Otherwise, the guard condition 210 is not satisfied and the guarded rule 212 is not processed. When guard condition 210 is satisfied, guarded rule 212 inserts the value of the local variable "memorydata" after the "destination" field of the received packet.

Rule 214 forwards the packet processed by rules 202, 204, 206, and 208 to the output port "packetout."

FIG. 3 is a graph diagram of an example dependency graph for a packet processor in accordance with various embodiments of the invention. The dependency graph has a node for each rule without a guard condition, and two nodes for each rule with a guard condition.

The dependency graph has a node 302 corresponding to the rule 202 of FIG. 2. FIG. 3 similarly has a node 304 for rule 204 of FIG. 2, node 306 for rule 206, and node 314 for rule 214. FIG. 3 also has a node 310 for the guard condition 210 of rule 208 of FIG. 2, and a node 312 for the guarded rule 212 of rule 208.

The processing of the guarded rule 212 depends on first determining whether or not the guard condition 210 is satisfied. Thus, FIG. 3 includes an edge 316 from node 312 to node 310. In another embodiment, the direction of edges is reversed to show the required order of processing instead of the direction of dependency.

In addition to edges for rules with a guard condition, the dependency graph includes edges for data dependencies between the rules. For example, rule 206 defines a value of local variable "memorydata" and guarded rule 212 uses the value of "memorydata" to modify the packet. Thus, FIG. 3 includes an edge 318 from node 312 to node 306. Before the packet can be forwarded to the output port, all rules that modify packet fields should be processed. Thus, FIG. 3 includes edges 320, 322, and 324 from the node 314 corresponding to the forwarding rule 214 to the nodes 302, 304, and 312 respectively corresponding to the rules 202, 204, and 212 that modify the packet.

Figure 4:
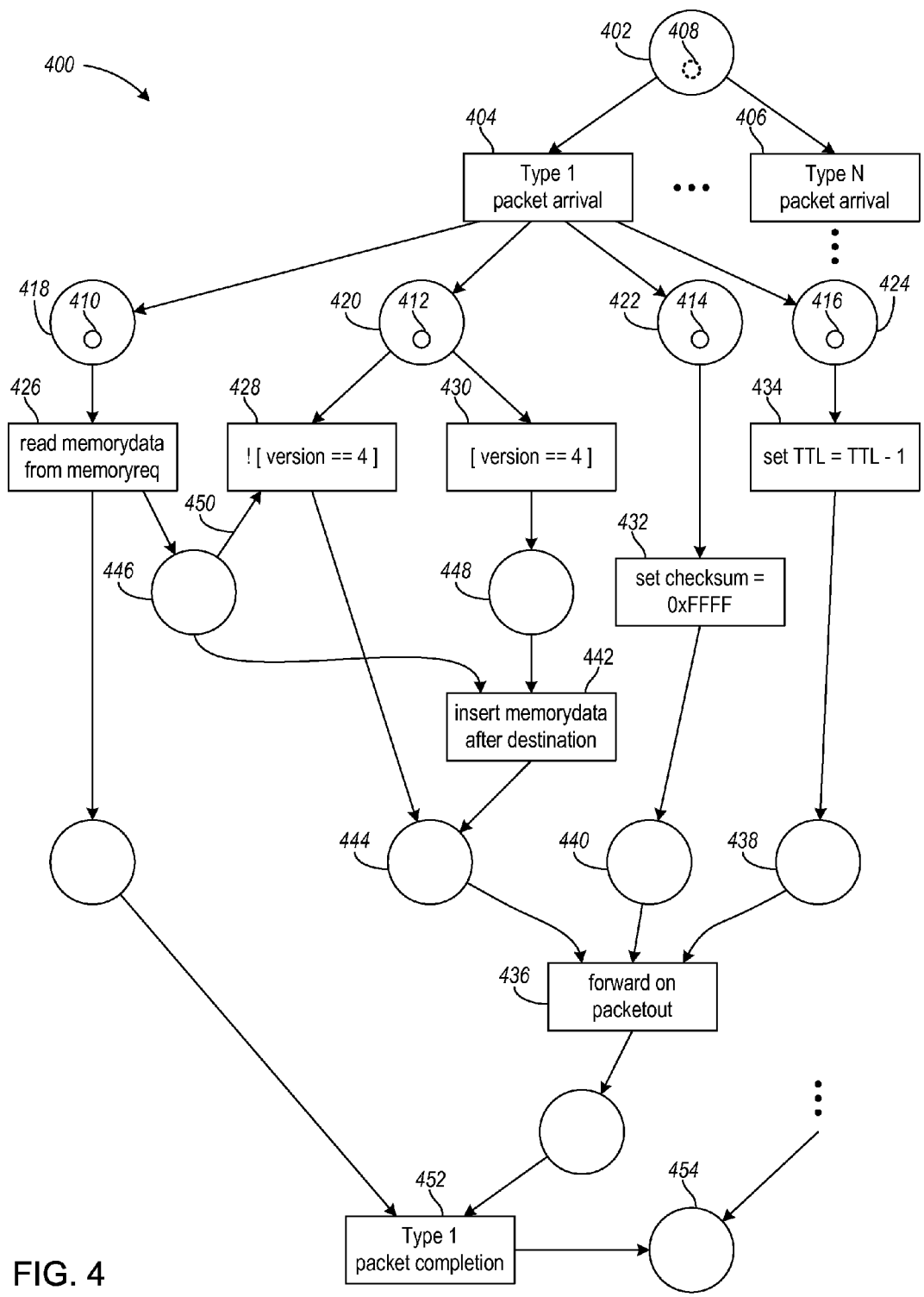
FIG. 4 is a Petri net for an example packet processor in accordance with various embodiments of the invention.

FIG. 4 is a Petri net 400 for an example packet processor in accordance with various embodiments of the invention. The Petri net 400 is generated from the declarative description of FIG. 2 and the dependency graph of FIG. 3, and from similar declarative descriptions and dependency graphs for processing additional types of packets.

The Petri net 400 includes a place 402 for indicating arrival of a packet at the packet processor. For a packet processor that processes multiple types of packets, the packet type can be indicated by a tag field within a header that is shared by all packet types, for example. If the arriving packet has a tag indicating a "type 1" packet, then transition 404 would be enabled to fire, and if the arriving packet has a tag indicating another type of pack, then transition 406 would be enabled to fire. However, Petri net 400 represents the possible behaviors of the packet processor. Thus, place 402 enables either transition 404 or transition 406 to fire, and the type of the arriving packet can be deduced from the transition that actually does fire.

FIG. 4 shows the state of Petri net 400 after a packet has arrived and transition 404 is firing. The firing of transition 404 consumes a token 408 from place 402 and produces tokens 410, 412, 414, and 416 in places 418, 420, 422, and 424, respectively. After transition 404 fires, token 408 is removed from input place 402. In general, a transition is enabled when there is a token in every place that has an arc directed to the transition, and one token is consumed from each of these places when the transition fires. The firing of a transition adds one token to each place connected to the firing transition by an arc from the firing transition to the place.

The current state of a Petri net is a marking associating one or more tokens with each place of the Petri net. The initial marking of Petri net 400 associates one token 408 with the input place 402. Each subsequent marking of the Petri net 400 is created by firing one or more of the enabled transitions to form a series of markings. While multiple tokens can be associated with each place in general, the markings of example Petri net 400 usually associate at most one token with each place.

The token 410 in place 418 enables transition 426 to fire. The token 412 in place 420 enables transition 428 or transition 430 to fire. The token 414 in place 422 similarly enables firing of transition 432, and the token 416 in place 424 enables firing of transition 434. Transitions 426, 428 or 430, 432, and 434 could fire concurrently or sequentially in any order. The Petri net 400 represents all these possible concurrent and sequential behaviors of the packet processor.

The dependencies shown in FIG. 3 add complexity to the Petri net 400. For example, the edge 320 from node 314 to node 302 in FIG. 3 is reflected in FIG. 4 by linking the transition 434 with the transition 436 by arcs and place 438. Similarly, edge 322 causes transition 432 to be linked to transition 436 via arcs and place 440, edge 324 causes transition 442 to be linked to transition 436 via arcs and place 444, and edge 318 causes transition 426 to be linked to transition 442 via arcs and place 446. The edge 316 of FIG. 3 from the node 312 to the node 310 for a guard condition causes a transition 430 for the guard condition to be linked to transition 442 via arcs and place 448. In general, each of the edges between two nodes of FIG. 3 is reflected in FIG. 4 by a respective place and two arcs linking the two transitions of FIG. 4 that correspond to the two nodes of FIG. 3.

A guard condition is either satisfied or dissatisfied. The Petri net 400 includes two transitions, 428 and 430, for the guard condition 210 of FIG. 2. Transition 428 represents the guard condition not being satisfied and transition 430 represents the guard condition being satisfied. Because for each packet the guard condition is either satisfied or not satisfied, the token 412 in place 420 enables either transition 428 or transition 430, but not both, to fire. If transition 428 fires, then transition 430 cannot fire for the packet, and the packet does not satisfy the guard condition. If transition 430 fires, then transition 428 cannot fire for the packet, and the packet satisfies the guard condition.

When transition 430 fires with the guard condition satisfied, token 412 is removed from place 420 and a token (not shown) is added to place 448. The token in place 448 (in combination with a token in place 446 for the data dependency discussed above) enables the firing of transition 442, and the firing of transition 442 produces a token in place 444. Thus, token 412 can be effectively moved from place 420 to place 444 by firing transitions 430 and 442 when the guard condition is satisfied. Furthermore, this token 412 can be effectively moved between the same two places 420 and 444 by firing transition 428 when the guard condition is not satisfied.

In summary, the Petri net is created to specify dependencies and guard conditions. For each dependency of an edge between a dependent node and a defining node in the dependency graph, a place is created in the Petri net, and this place enables the transition corresponding to the dependent node in response to the firing of the transition corresponding to the defining node. For each guard condition of the declarative description, a place and a pair of transitions are created, and the place enables one of these transitions to fire. Depending on which transition fires, the guard condition is either satisfied or not satisfied. In addition, the transition for the guarded rule is linked to the transition representing satisfaction of the guard condition.

Guard conditions can interact with a data dependency. Referring back to FIG. 2, the rule 208 includes a guarded rule 212 that requires data "memorydata" defined by rule 206. In FIG. 4, transition 426 corresponds to the defining rule 206 and transition 442 corresponds to the guarded rule 212. The data dependency is represented by the place 446 and the arcs connecting transitions 426 and 442 via place 446. If the guard condition is not satisfied for a packet, then transition 442 cannot fire, because a token is not produced in place 448. But after transition 426 fires, a token is produced in place 446, and this token cannot be consumed by transition 442 because transition 442 cannot fire for this packet. The token in place 446 could interfere with the modeling of the behaviors of the packet process for the next packet if this token remains in place 446. To consume this token in place 446 when the guard condition is not satisfied, Petri net 400 includes arc 450 that removes a token from place 446 when transition 428 fires because the guard condition is not satisfied.

When a guarded rule requires data defined by a defining rule, two transitions are created in the Petri net for the guard condition being satisfied and not satisfied, and a first place is created for enabling one of these transitions to fire. Respective transitions are created for the defining rule and the guarded rule, and a second place is created that links these transitions. This second place enables either the transition for the guard condition not being satisfied or the transition for the guarded rule. The transition for the guarded rule is enabled to fire by the second place together with the firing of the transition for the guard condition being satisfied, and the transition for the guard condition not being satisfied is enabled to fire by the combination of the first and second places.

For each packet, the firing of transitions completes with the firing of a packet completion transition, such as the packet completion transition 452 for packets of "type 1." The firing of the packet completion transition produces a token (not shown) in output place 454. The presence of a token in output place 454 indicates that the processing of the packet is complete. The token can be removed from place 454 and another token can be deposited in place 402 to begin the processing of another packet.

Figure 5:
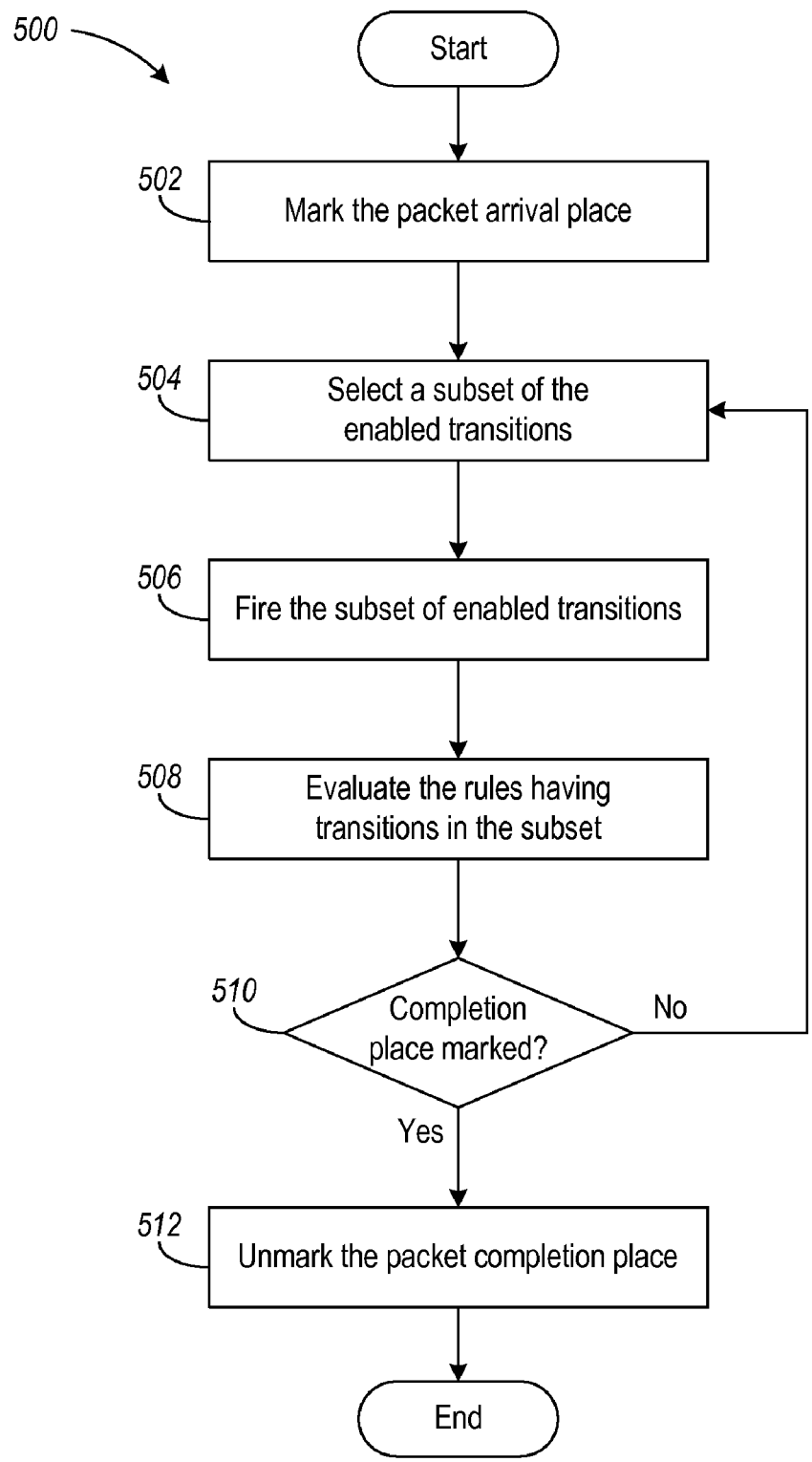
FIG. 5 is a flow diagram of a process for simulating a packet processor in accordance with various embodiments of the invention.

FIG. 5 is a flow diagram of a process 500 for simulating a packet processor in accordance with various embodiments of the invention. A simulation of the packet processor selects an order of performing the rules from the possible orders represented by the Petri net.

At step 502, the input place is marked to indicate arrival of a packet to be processed by the packet processor. At step 504, the transitions enabled to fire are determined, and a non-empty subset is selected including some or all of the enabled transitions. In one embodiment, the subset is randomly selected from the enabled transitions. At step 506, the transitions in the subset are fired to perform these transitions concurrently if the subset contains more than one transition.

At step 508, the rules that correspond to the fired transitions are evaluated. Depending on the rule, evaluation can set a value of a field of the packet, set a value of a variable, read a value from a location in a memory, or write a value to a location in a memory. If a fired transition corresponds to a guard condition being satisfied or not satisfied, the evaluation of the fired transition determines certain characteristics of the packet or the state of the packet processor. For example, if a fired transition corresponds to a guard condition being satisfied and the guard condition checks whether a field of the packet is equal to a specific value, then the evaluation of this fired transition effectively confirms that the field is set to the specific value.

Decision 510 checks whether the completion place is marked and processing of the packet is complete. If the completion place is marked, process 500 proceeds to step 512; otherwise, process 500 returns to step 504 to continue the simulation. At step 512, the packet completion place is unmarked to prepare the Petri net for the next simulation.

Figure 6:
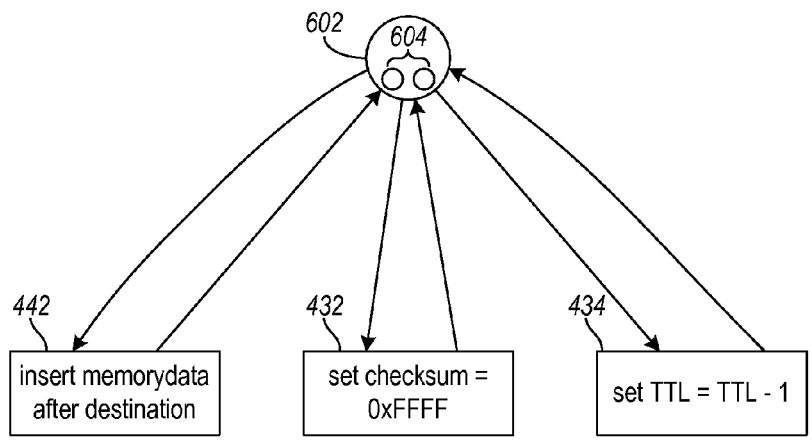
FIG. 6 is a portion of a Petri net for limiting concurrent processing of rules in accordance with one or more embodiments of the invention.

FIG. 6 is a portion of a Petri net for limiting concurrent processing of rules in accordance with one or more embodiments of the invention. While the Petri net is initially generated to represent all possible orders of processing the rules, the Petri net is modified to reduce the number of possible orders in one embodiment.

In one example, the packet is stored in a physical memory with two write ports. Rules that modify the packet should write to the memory using one of the write ports. Because the physical memory has only two write ports, the memory is limited to processing concurrently at most two rules that modify the packet. FIG. 4 includes three transitions 434, 432, and 442 corresponding to rules that modify the packet. These three transitions 434, 432, and 442 are reproduced in FIG. 6. For clarity, FIG. 6 shows the modification of the Petri net of FIG. 4 without showing any of the arcs, places, and transitions of FIG. 4 except for transitions 434, 432, and 442.

The modification of the Petri net includes adding a place 602, and two tokens 604 for place 602. At each firing of one or more of the transitions in the modified Petri net, zero, one, or two of the transitions 434, 432, and 442 can fire. All three of transitions 434, 432, and 442 cannot fire at any given firing, because place 602 would have to have three tokens to fire all three transitions 434, 432, and 442, and place 602 has only two tokens 604. When one or two of transitions 434, 432, and 442 fire, the firing transitions each consume one of tokens 604 from place 602 and produce a token returned to place 602. Thus, place 602 has a constant number of two tokens throughout the simulation. The modified Petri net represents the possible behaviors of a packet processor that complies with the implementation constraints imposed by the memory.

Figure 7:
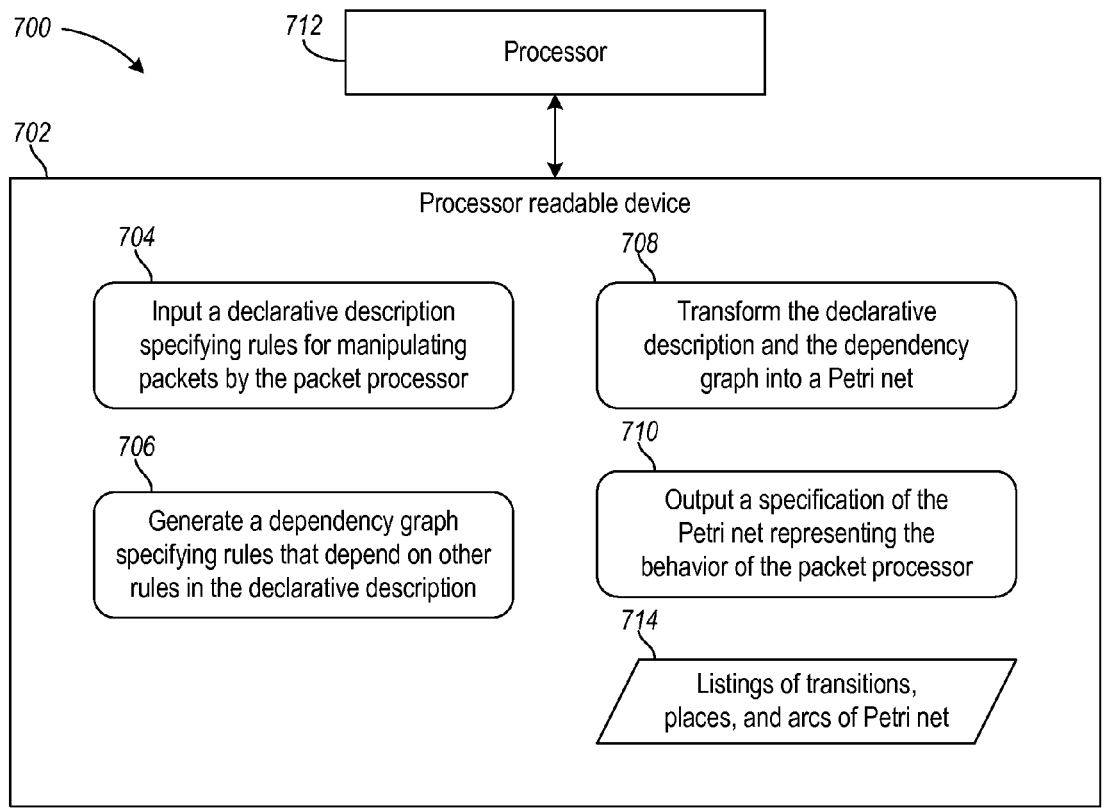
FIG. 7 is a block diagram of a system for representing the behaviors of a packet processor in accordance with one or more embodiments of the invention.

FIG. 7 is a block diagram of a system 700 for representing the behaviors of a packet processor in accordance with one or more embodiments of the invention. The processor-readable device 702 is configured with software modules 704, 706, 708, and 710 for representing behaviors of a packet processor.

Execution of the instructions in software module 704 causes processor 712 to input a declarative description of the packet processor. The declarative description specifies a plurality of rules for manipulating the packets. In one embodiment, processor 712 executing software module 704 provides means for inputting a declarative description of the packet processor.

Execution of the instructions in software module 706 causes processor 712 to generate a dependency graph from the declarative description. The dependency graph specifies each rule that depends upon another one or more of the rules. In one embodiment, processor 712 executing software module 706 provides means for generating a dependency graph from the declarative description.

Execution of the instructions in software module 708 causes processor 712 to transform the declarative description and the dependency graph into a Petri net that represents the behaviors of the packet processor. The Petri net includes respective transitions for the rules and places for enabling the respective transitions to fire. In one embodiment, processor 712 executing software module 708 provides means for transforming the declarative description and the dependency graph into a Petri net that represents the behaviors of the packet processor.

Execution of the instructions in software module 710 causes processor 712 to output a specification of the Petri net that represents the behaviors of the packet processor. In one embodiment, the specification 714 of the Petri net is output to the processor readable device 702 as a listing of the transition, places, and arcs of the Petri net. In one embodiment, processor 712 executing software module 710 provides means for outputting a specification of the Petri net representing the behaviors of the packet processor Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for representing behaviors of packet processors. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of representing behaviors of a processor of a plurality of packets, comprising:
   inputting a declarative description that specifies a plurality of rules for manipulating the packets;
   generating a dependency graph from the declarative description, wherein the dependency graph specifies each of the rules that depends upon another one or more of the rules;
   transforming, by a computer, the declarative description and the dependency graph into a Petri net representing the behaviors of the processor, wherein the Petri net includes a plurality of respective transitions for the rules and a plurality of places for enabling the respective transitions to fire; and
   outputting a specification of the Petri net representing the behaviors of the processor.

2. The method of claim 1, wherein the inputting of the declarative description includes inputting the declarative description that specifies the rules without specifying an ordering of the rules in the behaviors of the processor.

3. The method of claim 1, wherein the inputting of the declarative description includes inputting the declarative description that specifies the rules that include a field-set rule for setting a value of one of a plurality of fields of at least one type of the packets, a variable-set rule for setting a value of a variable, a memory-read rule for reading a value from a location in a memory, and a memory-write rule for writing a value to a location in a memory.

4. The method of claim 1, wherein the inputting of the declarative description includes inputting the declarative description that specifies a guard condition for each of at least one of the rules, the guard condition enabling and disabling the rule in response to a Boolean condition respectively being satisfied and unsatisfied.

5. The method of claim 4, wherein the Boolean condition of the guard condition is a function of at least one of a variable and a field, the field being one of a plurality of fields of at least one type of the packets.

6. The method of claim 4, wherein the generating of the dependency graph includes generating the dependency graph that includes a node for each rule, a node for each guard condition, an edge for each guard condition between the node of the guard condition and the node of the rule having the guard condition, and an edge for each pair of a first and second one of the rules having the first rule define data that is required by the second rule, the edge between the nodes of the first and second rule.

7. The method of claim 6, wherein the transforming of the declarative description and the dependency graph into the Petri net includes, for each pair of the first and second rules creating a place in the Petri net for enabling the respective transition of the second rule in response to firing the respective transition of the first rule, and the transforming of the declarative description and the dependency graph into the Petri net further includes, for each guard condition, creating an additional place and a pair of additional transitions in the Petri net, the additional place for enabling one of the additional transitions to fire.

8. The method of claim 6, wherein the transforming of the declarative description and the dependency graph into the Petri net includes, for each pair of the first and second rules with the second rule having a guard condition, creating a first and second transition for the guard condition and a first place for enabling one of the first and second transitions to fire, and creating a second place for enabling one of the second transition and the respective transition of the second rule to fire, the respective transition of the second rule enabled to fire in response to the second place and firing of the first transition, and the second transition enabled to fire in response to the first and second places.

9. The method of claim 1, wherein the generating of the dependency graph includes generating the dependency graph that includes a node for each rule, and an edge for each pair of a first and second one of the rules having the first rule define data that is required by the second rule, the edge between the nodes of the first and second rules.

10. The method of claim 1, wherein the Petri net further includes a plurality of respective pairs of transitions for a plurality of guard conditions for enabling and disabling the rules.

11. The method of claim 1, wherein the transforming of the declarative description and the dependency graph into the Petri net includes, for each pair of a first and second one of the rules having the first rule define data that is required by the second rule, creating a place in the Petri net for enabling respective transition of the second rule to fire in response to firing of the respective transition of the first rule.

12. The method of claim 1, wherein the transforming of the declarative description and the dependency graph into the Petri net includes creating an input place and an output place in the Petri net, the input place associated with arrival of one of the packets at the processor, and the output place associated with completion of processing of the packet by the processor.

13. The method of claim 1, further comprising initializing a initial marking of the places of the Petri net, and generating each additional one of the markings in a series from a prior marking in the series.

14. The method of claim 1, further comprising initializing a initial one of a series of markings of the places of the Petri net, and generating each additional one of the markings in the series from a prior marking in the series, the generating the additional marking from the prior marking including firing one or more of the transitions enabled by the prior marking.

15. The method of claim 14, further comprising simulating the operation of the processor, including evaluating each of the rules in response to the firing of the respective transition of the rule during the generating of each additional marking in the series.

16. The method of claim 1, wherein the outputting of the specification of the Petri net includes outputting the specification that represents the behaviors of all possible partial orders of the processor processing the rules.

17. The method of claim 1, wherein the outputting of the specification of the Petri net includes storing in a memory of computer system a listing of the respective transitions of the Petri net, a listing of the places of the Petri net, and a listing of a plurality of arcs of the Petri net.

18. The method of claim 1, further comprising modifying the Petri net to represent implementation constraints, the modifying including creating an additional place coupled in both directions to the respective transition of each of a plurality of the rules, wherein the additional place limits a number of the plurality of the rules that can be processed concurrently by the processor, and the number is specified by an integer value of an initial marking of the additional place.

19. A program storage medium, comprising:
a processor-readable device configured with instructions, wherein execution of the instructions by one or more processors causes the one or more processors to perform operations for representing behaviors of a packet processor, wherein the operations include:
inputting a declarative description of the packet processor, wherein the declarative description specifies a plurality of rules for manipulating the packets;
generating a dependency graph from the declarative description, wherein the dependency graph specifies each of the rules that depends upon another one or more of the rules;
transforming the declarative description and the dependency graph into a Petri net representing the behaviors of the packet processor, wherein the Petri net includes a plurality of respective transitions for the rules and a plurality of places for enabling the respective transitions to fire; and
outputting a specification of the Petri net representing the behaviors of the packet processor.

20. A system for representing behaviors of a processor of a plurality of packets, comprising:
means for inputting a declarative description of a packet processor, wherein the declarative description specifies a plurality of rules for manipulating the packets;
means for generating a dependency graph from the declarative description, wherein the dependency graph specifies each of the rules that depends upon another one or more of the rules;
means for transforming the declarative description and the dependency graph into a Petri net representing the behaviors of the packet processor, wherein the Petri net includes a plurality of respective transitions for the rules and a plurality of places for enabling the respective transitions to fire; and
means for outputting a specification of the Petri net representing the behaviors of the packet processor.

* * * * *